(12) United States Patent
Krallinger

(10) Patent No.: US 8,172,075 B2
(45) Date of Patent: May 8, 2012

(54) APPARATUS FOR PRODUCING AND/OR PROCESSING PANELS

(75) Inventor: Rupert Krallinger, Österreich (AT)

(73) Assignee: Interglarion Limited, Nikosia (CY)

( * ) Notice: Subject to any disclaimer, the term of this patent is extended or adjusted under 35 U.S.C. 154(b) by 141 days.

(21) Appl. No.: 12/375,618

(22) PCT Filed: Jul. 30, 2007

(86) PCT No.: PCT/EP2007/006731
§ 371 (c)(1),
(2), (4) Date: Jan. 29, 2009

(87) PCT Pub. No.: WO2008/014962
PCT Pub. Date: Feb. 7, 2008

(65) Prior Publication Data
US 2009/0314612 A1 Dec. 24, 2009

(30) Foreign Application Priority Data

Jul. 31, 2006 (DE) .......................... 10 2006 035 647

(51) Int. Cl.
*B65G 15/00* (2006.01)
(52) U.S. Cl. .................................................. 198/626.1
(58) Field of Classification Search ............... 198/626.1, 198/626.3–626.6
See application file for complete search history.

(56) References Cited

U.S. PATENT DOCUMENTS

| | | | | |
|---|---|---|---|---|
| 3,143,232 A | * | 8/1964 | Hansel, Jr. et al. ...... | 414/416.06 |
| 3,610,500 A | | 10/1971 | Brown et al. | |
| 3,897,869 A | * | 8/1975 | Michael ..................... | 198/621.1 |
| 4,015,722 A | * | 4/1977 | Cooper et al. ............. | 414/788.2 |
| 4,502,586 A | * | 3/1985 | Dusel et al. ................ | 198/345.1 |
| 4,585,118 A | * | 4/1986 | Plaut .............................. | 198/840 |
| 4,807,352 A | * | 2/1989 | Carpani ....................... | 29/564.1 |
| 4,817,781 A | * | 4/1989 | Folk ............................ | 198/626.5 |
| 5,145,053 A | * | 9/1992 | Krieger et al. ............. | 198/626.5 |
| 5,170,880 A | * | 12/1992 | Low ............................ | 198/626.5 |
| 5,368,212 A | * | 11/1994 | Koch ............................ | 226/172 |
| 5,368,643 A | * | 11/1994 | Kuster ......................... | 118/324 |
| 5,412,853 A | * | 5/1995 | Catallo ......................... | 26/18.6 |
| 5,511,651 A | * | 4/1996 | Barth ........................... | 198/817 |
| 5,547,065 A | * | 8/1996 | Watanabe et al. ............ | 198/604 |
| 5,611,858 A | * | 3/1997 | Zejda ............................. | 118/50 |
| 5,701,990 A | * | 12/1997 | Novak et al. ................. | 198/604 |
| 5,921,377 A | * | 7/1999 | Tan et al. ..................... | 198/817 |

(Continued)

FOREIGN PATENT DOCUMENTS

| | | |
|---|---|---|
| DE | 17 561 | 10/1959 |
| DE | 198 11 242 | 7/1999 |
| DE | 100 23 575 | 11/2001 |
| DE | 101 14 342 C1 | 11/2002 |

(Continued)

*Primary Examiner* — Joseph A Dillon, Jr.
(74) *Attorney, Agent, or Firm* — Greenblum & Bernstein, P.L.C.

(57) ABSTRACT

Device for producing and/or processing panels includes a panel transport device utilizing two double-belt conveyors for transporting panels along a transport path. A processing device is used for processing the panels during their transporting by the panel transport device. Each of the two double-belt conveyors includes an upper endless belt and a lower endless belt having transport strand sides essentially parallel to the transport path and deflection devices arranged to at the ends of the transport strand sides. A plurality of guide rollers are arranged between the deflection devices of at least one of the endless belts to support the transport strand side of the at least one endless belt. At least one roller cassette is arranged to support several of the plurality of guide rollers.

20 Claims, 4 Drawing Sheets

U.S. PATENT DOCUMENTS

| | | | |
|---|---|---|---|
| 6,076,826 A * | 6/2000 | Gerlier et al. | 271/274 |
| 6,241,079 B1 * | 6/2001 | Weber et al. | 198/817 |
| 6,244,846 B1 * | 6/2001 | Keller | 425/11 |
| 6,354,430 B1 * | 3/2002 | Oe | 198/626.6 |
| 6,719,123 B2 * | 4/2004 | Jackson et al. | 198/626.1 |
| 7,044,707 B2 * | 5/2006 | Garin et al. | 414/749.1 |
| 2004/0129614 A1 | 7/2004 | Garin et al. | |
| 2005/0269187 A1 | 12/2005 | Jenkins et al. | |

FOREIGN PATENT DOCUMENTS

| | | |
|---|---|---|
| DE | 20 2004 001 671 | 5/2004 |
| DE | 103 18 621 | 11/2004 |
| DE | 10 2005 005 478 | 1/2006 |
| EP | 1 413 530 | 4/2004 |
| WO | 03/062111 | 7/2003 |

* cited by examiner

APPARATUS FOR PRODUCING AND/OR PROCESSING PANELS

CROSS-REFERENCE TO RELATED APPLICATIONS

The present application is a U.S. National Stage of International Patent Application No. PCT/EP2007/006731 filed Jul. 30, 2007, and claims priority of German Patent Application No. 10 2006 035 647.0 filed Jul. 31, 2006. Moreover, the disclosure of International Patent Application No. PCT/EP2007/006731 is expressly incorporated by reference herein in its entirety.

BACKGROUND OF THE INVENTION

1. Field of the Invention

The present invention relates to a device for producing and/or processing panels that includes a transport device for transporting panels along a transport path and a processing device for processing the panels during their movement by the transport device.

2. Discussion of Background Information

Devices of this type are known, for example, in the field of the production of flooring panels for processing the longitudinal and/or transverse sides of the panels. In a known use, a milling tool is used as a processing device, which milling tool embodies or forms a groove on one side of a panel conveyed by the transport device and a tongue corresponding to the geometry of the groove on the opposite side of the panel. The processing of the panels to embody tongue and groove is thereby generally carried out at a plurality of processing stations that are arranged distributed along the transport device and are supplied with panels successively by the transport device.

For the automated sequence of the production and/or processing of panels, in particular for the reliable and precise processing of the panels in the processing devices, it is of vital importance that the panels are conveyed to the processing devices reliably by the transport device with precise and constant position and orientation. With conventional devices for producing and/or processing panels, for example, chain conveyors are thereby used, in which an endless circulating chain is guided along the transport path, the chain links of which on the one hand bear guide parts that are guided in guide rails aligned along the transport path for guiding the chain, and on the other hand bear a bearing area, on which the panel rests. In order to reduce lateral tilting movements of the transported panel out of the horizontal plane, in a known further development of the chain conveyor, the guide parts attached to the chain links are respectively extended on each side perpendicular to the transport direction and guided on two rails running at a distance from one another parallel to the transport direction.

However, in practical use it has been shown with the two known chain conveyors that in particular with the transport of narrower panels or at higher transport speeds, marked deviations from the desired position of the panels occur, which ultimately leads to a faulty processing of the panels in the processing devices or even to a breakdown of the transport and a downtime of the device associated therewith. Furthermore, chain conveyors are structured in a relatively complex manner and, due to high frictional forces between the guide parts and the guide rails, require a relatively high energy expenditure for the drive and high maintenance and repair costs due to wear.

Higher transport speeds can be achieved through belt conveyors, which are likewise used as a transport device in known devices for producing and/or processing panels. In the belt conveyors, two endless belts slide parallel to one another in guide rails that are aligned along the transport path. The belts run in a guide groove of the guide rails, the depth of which is smaller than the height of the belts, so that a panel to be transported can be placed on the sections of the belts lying free, and carried along by frictional contact.

Although the position accuracy of the panels can be increased with the aid of the belt conveyors in particular at higher speeds, conveyors of this type are associated with high acquisition costs, since the guide rails have to be produced in an extrusion process with high precision along their entire length and may not show any deformation at all in particular with local or temporal temperature fluctuations. The guide rails produced for this reason with relatively high material strength are not only expensive and very heavy and cumbersome due to their length and width, they are also unsuitable for transporting narrower panels, since a certain minimum distance is preset between the belts guided parallel due to the width of the rails.

Furthermore, due to the given friction between the belts and the guide rails, a relatively high drive power is necessary for the movement of the belts and a wear of these components is inevitable with longer operation, so that, in addition, the operating costs of the known device are also relatively high. Although it has already been suggested for the known belt conveyors to reduce the friction force between the belts and the guide rails by guiding the belts on an air cushion generated in the guide groove of the guide rails, the provision of corresponding compressed-air devices leads to a further increase in the acquisition and operating costs of the device.

Another known device with which in particular narrower panels are also to be transported, includes only a single endless belt guided along the transport path and a guide bar attached to the transport device next to the transport belt, which guide bar stands up from the transport device in a perpendicular manner and is aligned in the direction of the transport path. The guide bar engages in a longitudinal groove of the panel to be transported, which is inserted in the underside of each panel especially for this purpose.

Although a relatively stable lateral guidance even of narrower panels can be achieved with a guide bar of this type, an additional step of milling the guide groove in each panel is necessary with this solution. If a guide groove of this type is inserted in the underside of a panel, furthermore the counteracting paper applied to the underside of the panel must be cut through, which then to a large extent loses its effect for stabilizing the planar plate form of the panel so that a dishing of the panel occurs due to the tension of the laminate applied to the top of the panel.

SUMMARY OF THE INVENTION

In view of this background, the present invention provides a device of the type mentioned at the outset, which transports panels, in particular also narrower panels, reliably and with high position accuracy along the transport path and which can be used with higher cost-effectiveness.

According to the present invention a device of the type mentioned at the outset has a transport device that includes two double-belt conveyors with respectively one upper endless belt and one lower endless belt, which respectively have a transport strand side essentially parallel to the transport path and at both of the ends of the transport strand side are respectively deflected by deflection devices. The upper endless belts touch a panel to be transported on the upper surface side thereof and the lower endless belts touch the panel on the lower surface side thereof, and at least one of the endless belts is guided on its transport strand side by a plurality of guide rollers arranged between the deflection devices.

When general positional data such as, for example, "up," "down," "lateral" or "one behind the other," etc., are used in the present specification and the associated claims, these data refer to the construction and design of a device in which the panels are transported essentially horizontally, i.e., such that their visible surfaces lie essentially in a horizontal plane. Of course, the subject matter of the invention should also include devices in which panels are transported in a different orientation, wherein the above-referenced positional data then refer to the visible surface of the panels to be transported as an imaginary horizontal plane.

In the device according to the invention, a panel to be transported can be taken up by the two double-belt conveyors respectively reliably between the upper endless belt and the lower endless belt and safely moved forward by the frictional contact on both sides along the transport path. The transported panel then bears against two upper endless belts and two lower endless belts simultaneously and in this manner can be held in a stable manner in a panel plane, preferably a horizontal plane, during the transport.

According to an important feature of the invention, at least one of the endless belts is guided on its transport strand side by a plurality of guide rollers arranged between the deflection devices. The friction losses occurring during the belt guidance are clearly reduced in this manner, and are thus essentially limited to the low friction losses through rolling friction on the guide rollers with the device according to the invention in the area of the transport strand side of the respective endless belt. The drive power necessary to move the endless belt and the wear occurring on the components of the transport device are correspondingly lower. The accruing operating costs can thus be reduced and the cost-effectiveness of the device can be increased.

The guidance according to the invention of the at least one endless belt over the guide rollers furthermore renders possible the reliable operation of the device even at higher transport speeds, without an excessive wear, an excessive power consumption or excessive position imprecision having to be accepted thereby. The use of a guide bar mentioned above in connection with the prior art and the associated milling of a guide groove in the underside of the panels can also be omitted in the device according to the invention.

With regard to the production expenditure and the associated acquisition costs of the device according to the invention, it can be established that guide rollers can be produced and attached to a frame of the transport device in a structurally simple manner and, in particular, the provision of rail profiles to be extruded with high precision can be omitted.

The use of a plurality of guide rollers in practical use of the device furthermore has surprising advantages with respect to the precision of the belt guide. It is thus possible, for instance, to readjust the bearings of individual guide rollers or groups of guide rollers upon initial installation or after a certain operating time, in order to compensate for certain position deviations based on a local or temporal temperature change due to production tolerances or based on wear.

In a preferred embodiment of the invention, in at least one of the two double-belt conveyors at least one of the guide rollers is supported in a roller cassette that is attached to the double-belt conveyors. It is also possible thereby that a plurality of guide rollers, preferably two guide rollers, are supported in at least one roller cassette. The support of guide rollers in roller cassettes provides the advantage that the guide rollers jointly with a bearing rotatably supporting the guide rollers, can be mounted on and/or detached from the double-belt conveyors as an assembly, as it were. On the one hand it is possible in this manner to equip a double-belt conveyors with low expenditure with a plurality of guide rollers, on the other hand, a relatively uncomplicated disassembly of the guide rollers together with their associated bearings is possible if a replacement of these components is necessary.

The guide rollers can preferably have a circumferential groove, in particular a groove with essentially rectangular cross section, in order to accommodate the endless belt therein. Through a groove of this type the endless belt can be safely guided between the side walls of the groove and can be kept always parallel to the transport path even at high speeds.

The possibility already mentioned of the individual adjustment of the individual guide rollers can be realized in a simple manner in that at least one of the two double-belt conveyors has a frame and a roller adjustment device attached to or embodied or formed on the frame, by which a position and/or orientation of the roller axis of at least one of the guide rollers can be adjusted with respect to the frame. In order to keep the labor expenditure for adjusting the individual rollers within reasonable limits, the roller adjustment device can be set up to adjust the roller axes of a plurality of guide rollers simultaneously. The guide rollers can in particular be arranged distributed in several groups along the transport path, wherein a roller adjustment device can then be assigned to each group of guide rollers in order to adjust the roller axes of the guide rollers assigned to this group simultaneously.

When at least one of the guide rollers is supported in a roller cassette in the manner described above, it is furthermore proposed to embody the position and/or the orientation of the at least one roller cassette in an adjustable manner. With a roller adjustment device of this type, a roller cassette can thus be moved for adjustment purposes, which represents a simple and very effective way of adjusting the roller axes of a plurality of guide rollers simultaneously.

The device according to the invention is in particular also suitable for processing narrower panels, since the guide rollers used can be structurally simple and have a narrow width and thus the two double-belt conveyors can be arranged very close to one another in the lateral direction. In order to further promote the processing of narrower panels, and in particular also to be able to reliably transport panels with a width of less than 115 mm, it is proposed in a further development of the invention that the width of the endless belts, measured in a direction orthogonal to the transport path and parallel to a panel plane, is less than approx. 3 cm, preferably between approx. 2.5 cm and approx. 1 cm, even more preferably approx. 1.5 cm.

As a further measure to reduce the minimum width of the panels that can be transported safely, the spacing between the two upper endless belts of the two double-belt conveyors and/or the spacing between the two lower endless belts of the two double-belt conveyors can be adjustable in the transport strand sides of the endless belts to a value of less than approx. 5 mm, preferably to a value between approx. 3 mm and approx. 0.5 mm and even more preferably to a value of approx. 1 mm. The device according to the invention then also renders possible if necessary the transport of panels with a width of only approx. 85 mm.

The device according to the invention can be used particularly flexibly if a spacing between the two double-belt conveyors is adjustable. The device can then be adapted as needed to a specific type of panels to be produced or to be processed.

As already mentioned, the device according to the invention also has an improved cost-effectiveness because slight position changes of the individual guide rollers due to temperature fluctuations can be compensated for by a readjustment of individual rollers and thus the friction losses of the belt guide can always be kept to a minimum level. Since essentially only the relative positioning of the guide rollers or groups of guide rollers among themselves is important for an easy-glide belt guidance, to further simplify the device a guide roller or a group of guide rollers can be held fixed to the double-belt conveyors and only the remaining guide rollers or groups of guide rollers are adjustable in their position and/or orientation.

In the same way, one of the double-belt conveyors can be connected to a carrier of the device via at least one slot coupling. At least one slot of the slot coupling can extend essentially parallel to the transport path. Temperature extensions of a frame of the double-belt conveyors can also be compensated for by the slot couplings and do not lead to internal stresses in the double-belt conveyors and thus to a deformation of the guide of the endless belt, whereby another source of possible friction losses can be counteracted.

Particularly advantageously, the present invention is used in a device in which the processing device has at least one milling device for milling a longitudinal side and/or a transverse side of a panel. Such milling work must be carried out with particularly high precision in order to ensure the most level, step-free visible surface possible of the panels later joined to one another, so that the advantages of a reliable and precise guidance of the panels through the measures according to the invention are particularly effective with a device of this type.

Embodiments of the invention are directed to a device for producing and/or processing panels. The device includes a transport device comprising two double-belt conveyors for transporting panels along a transport path, and a processing device for processing the panels during their transporting by the transport device. Each of the two double-belt conveyors include an upper endless belt and a lower endless belt having transport strand sides essentially parallel to the transport path and deflection devices arranged to at the ends of the transport strand sides. A plurality of guide rollers are arranged between the deflection devices of at least one of the endless belts to support the transport strand side of the at least one endless belt, and at least one roller cassette is arranged to support several of the plurality of guide rollers.

According to features of the embodiments, the upper endless belts are structured and arranged to contact an upper surface side of a panel to be transported and the lower endless belts are structured and arranged to contact a lower surface side of the panel.

In accordance with further features, the at least one roller cassette is arranged to support two guide rollers and/or the at least one roller cassette is attached to the at least one endless belt.

Moreover, the plurality of guide rollers have a circumferential groove structured and arranged to accommodate the at least one endless belt, and the circumferential groove has an essentially rectangular cross-section.

According to still further features of the embodiments of the invention, at least one of two double-belt conveyors has a frame and a roller adjustment device one of attached to or formed on the frame. The roller adjustment device is structured and arranged to adjust at least one of a position and an orientation of a roller axis of at least one of the plurality of guide rollers with respect to the frame. Further, the roller adjustment device is structured and arranged to simultaneously adjust roller axes of a number of the plurality of guide rollers. Still further, the roller adjustment device is structured and arranged to adjust at least one of a position and an orientation of the at least one roller cassette.

In accordance with still other features of the embodiments, a width of at least one of the upper and lower endless belts of the at least one double-belt conveyors, measured in a direction orthogonal to the transport path and parallel to a panel plane, is less than approx. 3 cm. Further, the width is between approx. 2.5 cm and approx. 1 cm. Still further, the width is approx. 1.5 cm.

According to other features, the two double-belt conveyors are adjustably spaced from each other.

According to still other features of the embodiments of the present invention, the two double-belt conveyors are arranged with an adjustable spacing between the transport strand sides of at least one of the upper endless belts and the lower endless belts. The adjustable spacing is set to a value of less than approx. 5 mm. Further, the adjustable spacing is set to a value between approx. 3 mm and approx. 0.5 mm. Still further, the adjustable spacing is set to a value of approx. 1 mm.

The device can further include a carrier coupled to at least one of the two double-belt conveyors, at least one slot coupling of the carrier that including at least one slot extending essentially parallel to the transport path, and a frame connected to the carrier via the at least one slot coupling.

In accordance with still yet other features of embodiments of the present invention, the processing device includes at least one milling device structured and arranged to milling at least one of a longitudinal side of a panel and a transverse side of a panel.

BRIEF DESCRIPTION OF THE DRAWINGS

The present invention is explained in more detail below based on a preferred embodiment with reference to the attached drawings.

DETAILED DESCRIPTION OF THE EMBODIMENTS OF THE INVENTION

Figure 1:
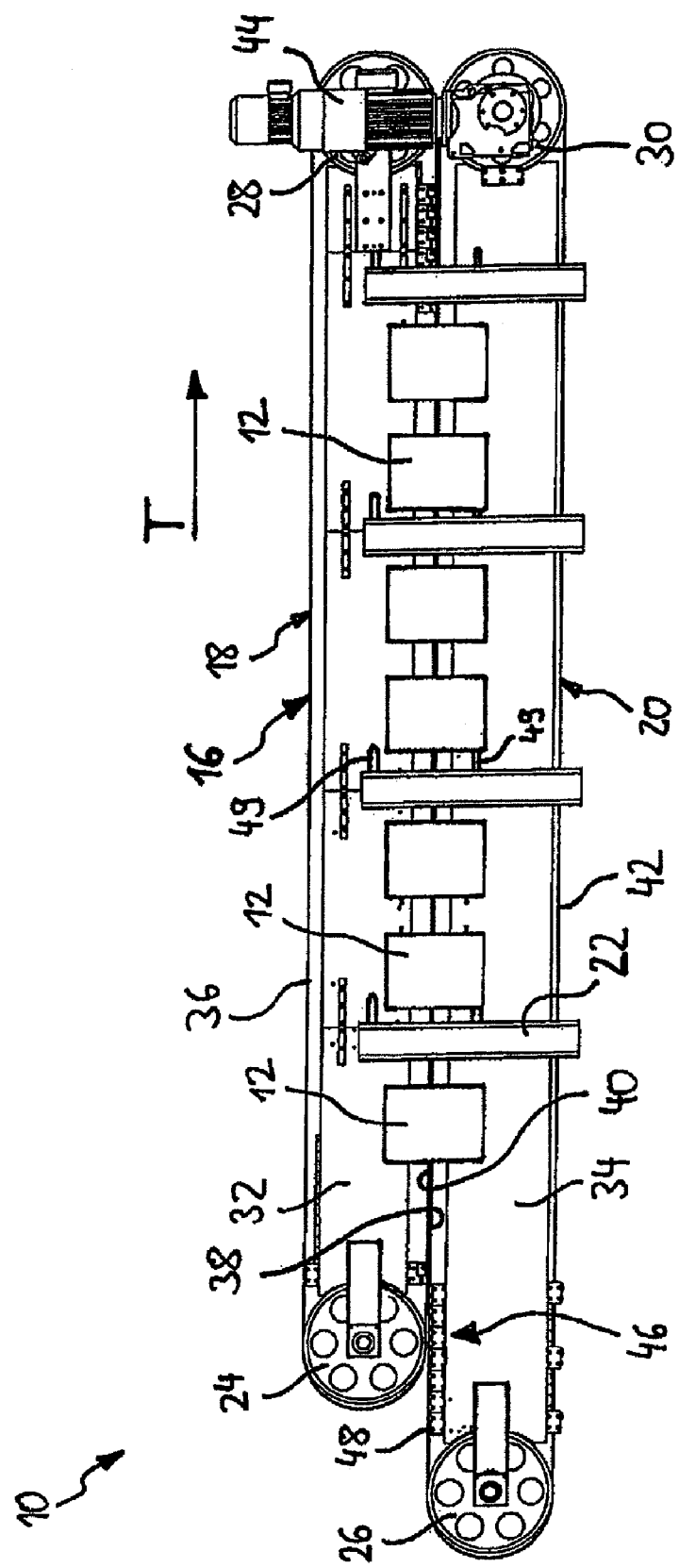
FIG. 1 illustrates a side view of a device for producing and/or processing panels according to a first embodiment of the invention.
Figure 5:
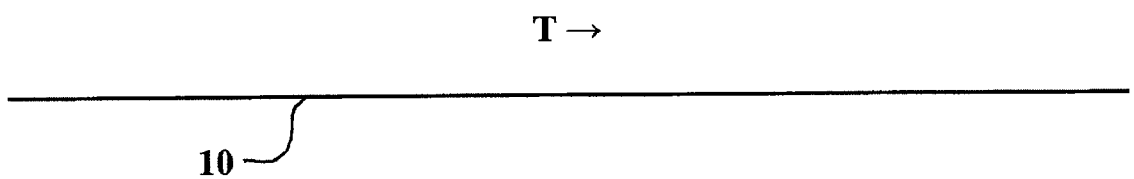
FIG. 5 shows a panel moving along a transport path.

In FIG. 1 a device according to the invention for producing and/or processing panels is labeled in general by 10, in which panels to be produced or processed are transported in a transport direction T (see FIG. 5) by a transport device to be described in more detail and in this manner are conveyed successively to several processing stations 12, which are shown only symbolically in FIG. 1. The processing stations 12 can be, for example, milling tools, which form a groove or a tongue on longitudinal or transverse sides of the panels, but they can also be positioning devices which perform a precise positioning of the panels necessary for the following processing station.

Figure 3:
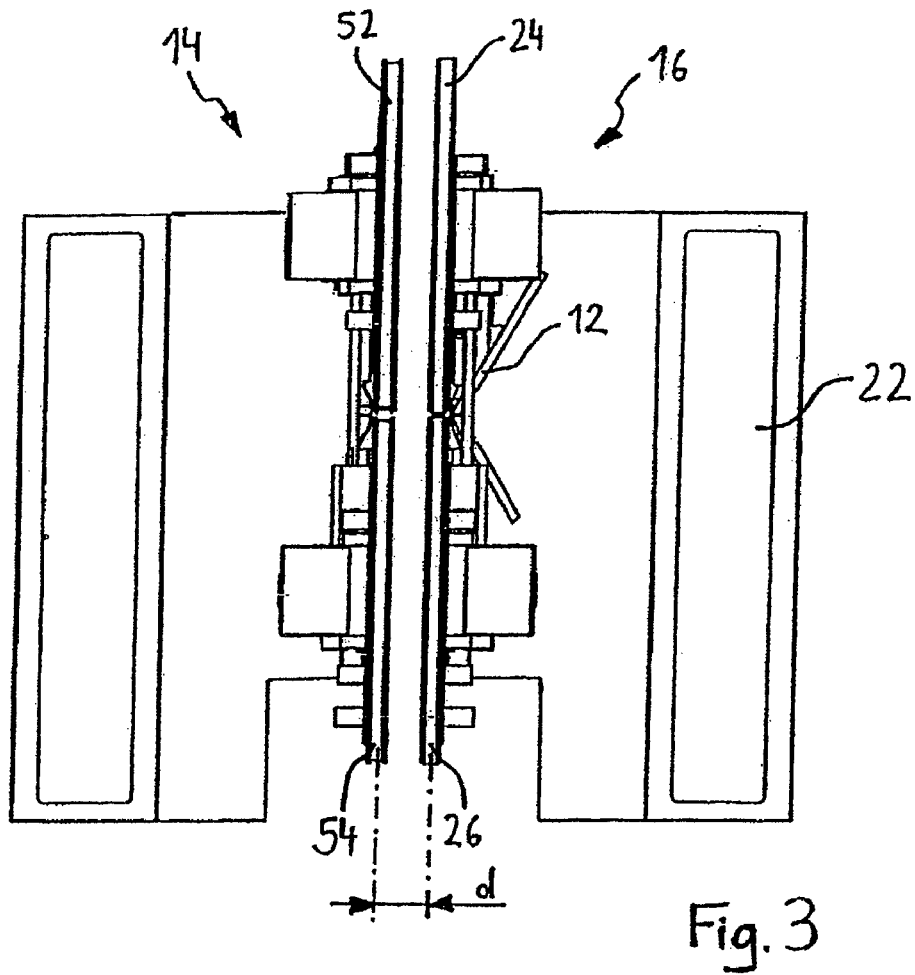
FIG. 3 illustrates a front face view of the device shown in FIGS. 1 and 2.

In order to convey the panels to the individual processing stations 12, a transport device of the device 10 has two double-belt conveyors 14, 16 running parallel to one another and arranged next to one another (see FIG. 3). As illustrated in FIG. 1, only the right side double-belt conveyor 16, when viewed in the transport direction, is visible, while the left side double-belt conveyor 14 shown in FIG. 3 is covered by it. Since the two double-belt conveyors 14, 16 correspond in their essential functional elements or are structured symmetrically to one another, the following description can be limited to the right double-belt conveyors 16.

The double-belt conveyors 16 comprises an upper belt conveyor 18 and a lower belt conveyor 20 arranged beneath it, both of which are attached oriented in the transport direction T to a fixed carrier 22 of the device 10. Both belt conveyors 18, 20 have, with respect to the transport direction T, respectively one upstream deflection roller 24 or 26 and one downstream deflection roller 28 or 30. The deflection rollers 24, 28 of the upper belt conveyor 18 are attached to the opposite ends of an upper frame 32, while the deflection rollers 26, 30 of the lower belt conveyor 20 are attached to opposite ends of a lower frame 34.

An upper belt 36 runs around the deflection rollers 24, 28 of the upper belt conveyor 18 to form two strand sides between the deflection rollers 24, 28. A lower strand side forms a transport strand side 38 for the panels. In a corresponding manner, a lower endless belt 42 runs around the two deflection rollers 26, 30 of the lower belt conveyor 20 to form, between the deflection rollers 26, 30, a lower and an upper strand side. The upper strand side forms a transport strand side 40 for the panels. The upper frame 32 and the lower frame 34 are attached to the common carrier 22 such that a panel to be transported can be taken up and carried along between the transport strand side 38 of the upper endless belt 36 and the transport strand side 40 of the lower endless belt 42.

The downstream deflection rollers 28, 30 are respectively connected to a drive device 44, with which the deflection rollers 28, 30 can be set in rotation and thus the endless belts 36, 42 in orbital motion. In general it is preferred for the deflection rollers to be provided respectively with a special rubber coating on their bearing surfaces in order to achieve a better belt adhesion. In this manner the guidance of the belts by the deflection rollers and the power transmission from the drive unit 44 via the deflection rollers to the belts can be carried out even more reliably.

Furthermore, it is discernible in FIG. 1 that the carrier 22 supporting the device 10 has a total of four posts, so that the frames 32, 34 of the belt conveyors 18, 20 are respectively supported on the carrier 22 at four points along the transport direction T. The connection between the frames 32, 34 and the posts of the carrier 22 is thereby respectively realized via a slot coupling 49, so that length changes of the frames due to temperature changes can be absorbed through a displacement of the attachment inside the slots 49 and thus cannot lead to internal stresses and deformations of the frames 32, 34.

In the embodiment according to FIG. 1, the transport strand side 40 of the lower endless belt 42 is guided over a guide roller group 46 in which a plurality of guide rollers 48 are arranged between the deflection rollers 26, 30 in the transport direction T one behind the other. Although only one guide roller group 46 is shown in FIG. 1 for reasons of clarity, the embodiment shown in the Figs. comprises a plurality of guide roller groups 46, which are arranged distributed along the transport direction T over the entire length of the device 10. It is thus possible to safely support the lower endless belt 42 in several sections along the transport strand side 40 and to guide it precisely. The arrangement of guide rollers 48 or guide roller groups 46 is, of course, also possible for the upper belt conveyor 18.

Figure 2:
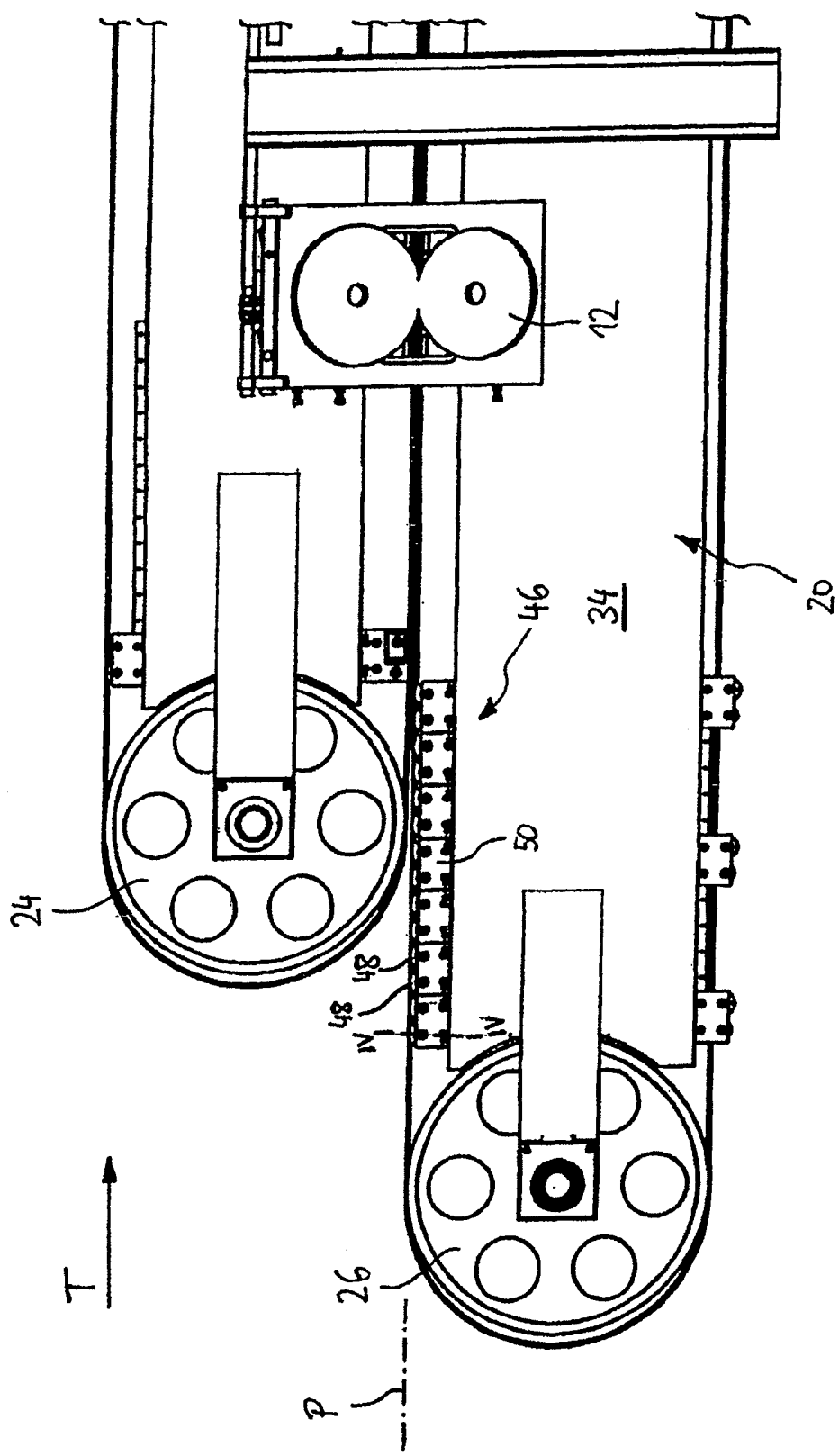
FIG. 2 illustrates in more detail an enlarged section of the representation of FIG. 1.

The guide roller group 46 can be seen more clearly in the enlarged representation of FIG. 2. It comprises in total seven roller cassettes 50, wherein two guide rollers 48 are arranged one behind the other in the transport direction T in each roller cassette 50. The guide rollers 48 are respectively arranged in a pivoted manner in the roller cassettes 50, wherein their roller rotation axes are oriented perpendicular to the transport direction T and parallel to a panel plane, which in general is a horizontal plane.

The roller cassettes 50 are attached to the frame 34 of the lower belt conveyor by a suitable adjustable attachment system, so that the roller cassettes 50 are operationally connected to the frame 34 in a fixed manner, but are adjustable if necessary with respect to their bearing and/or their orientation. For this purpose one skilled in the art can use slot connections, key joints or more complex adjusting mechanisms known per se. Alternatively or additionally, furthermore a mechanism can be provided in order to jointly adjust all of the roller cassettes 50 of the guide roller groups 46.

The device 10 can be used particularly advantageously for the production and/or processing of narrower panels. The structure of the device 10 of the two double-belt conveyors 14, 16 arranged next to one another is illustrated in the front face view of FIG. 3. The double-belt conveyor 14 on the left in FIG. 3 comprises analogously to the right double-belt conveyor 16 an upper upstream deflection roller 52 and a lower upstream deflection roller 54 and upper and lower downstream deflection rollers not discernible in FIG. 3. The transport strand sides of the two endless belts of the left double-belt conveyor 14 then have a spacing d from the transport strand sides 38 or 40 of the right double-belt conveyor 16, respectively.

The device 10 has an adjustment device not shown in the Figs. in order to move the double-belt conveyors 14, 16 towards and away from one another in order to thus be able to adjust the spacing d according to a panel type to be processed.

Figure 4:
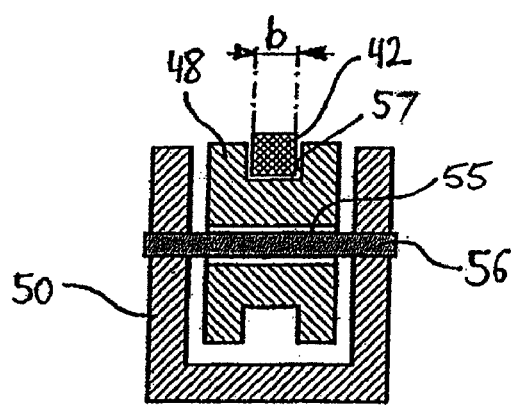
FIG. 4 illustrates diagrammatically a roller cassette in a sectional view according to a line IV-IV in FIG. 2.

In FIG. 4 a cross section through a roller cassette 50 is shown diagrammatically according to a line IV-IV in FIG. 2. It is discernible that the guide roller 48 supported in the roller cassette 50 has a groove 57 around its circumference, having an approximately rectangular cross section in order to accommodate therein the endless belt 42 likewise essentially rectangular in cross section with a width b measured orthogonally to the transport direction T.

By a bearing section 55, the guide roller 48 is pivoted on a bearing shaft 56, which is firmly anchored on its both opposite ends in the walls of the roller cassette 50.

The invention claimed is:

1. A device for producing and/or processing panels, comprising:
   a panel transport device comprising two double-belt conveyors for transporting panels along a transport path;
   a processing device for processing the panels during their transporting by the panel transport device;
   each of the two double-belt conveyors comprising:
      an upper endless belt and a lower endless belt having transport strand sides essentially parallel to the transport path and being structured and arranged to allow processing of lateral sides of the panel; and
      deflection devices arranged to at the ends of the transport strand sides;
   a plurality of guide rollers arranged between the deflection devices of at least one of the endless belts to support the transport strand side of the at least one endless belt; and
   at least one roller cassette arranged to support several of the plurality of guide rollers.

2. The device in accordance with claim 1, wherein the upper endless belts are structured and arranged to contact an upper surface side of a panel to be transported and the lower endless belts are structured and arranged to contact a lower surface side of the panel.

3. The device in accordance with claim 1, wherein the at least one roller cassette is arranged to support two guide rollers.

4. The device in accordance with claim 3, wherein the at least one roller cassette is attached to the at least one endless belt.

5. The device in accordance with claim 1, wherein the plurality of guide rollers have a circumferential groove structured and arranged to accommodate the at least one endless belt.

6. The device in accordance with claim 5, wherein the circumferential groove has an essentially rectangular cross-section.

7. The device in accordance with claim 1, wherein at least one of two double-belt conveyors has a frame and is adapted to utilize a roller adjustment device one of attached to or formed on the frame.

8. The device in accordance with claim 7, wherein a roller adjustment device is structured and arranged to adjust at least one of a position and an orientation of a roller axis of at least one of the plurality of guide rollers with respect to the frame.

9. The device in accordance with claim 7, wherein the roller adjustment device is structured and arranged to simultaneously adjust roller axes of a number of the plurality of guide rollers.

10. The device in accordance with claim 7, wherein the roller adjustment device is structured and arranged to adjust at least one of a position and an orientation of the at least one roller cassette.

11. The device in accordance with claim 1, wherein a width of at least one of the upper and lower endless belts of the at least one double-belt conveyors, measured in a direction orthogonal to the transport path and parallel to a panel plane, is less than approx. 3 cm.

12. The device in accordance with claim 11, wherein the width is between approx. 2.5 cm and approx. 1 cm.

13. The device in accordance with claim 11, wherein the width is approx. 1.5 cm.

14. The device in accordance with claim 1, wherein the two double-belt conveyors are adjustably spaced from each other.

15. The device in accordance with claim 1, wherein the two double-belt conveyors are arranged with an adjustable spacing between the transport strand sides of at least one of the upper endless belts and the lower endless belts.

16. The device in accordance with claim 15, wherein the adjustable spacing is set to a value of less than approx. 5 mm.

17. The device in accordance with claim 15, wherein the adjustable spacing is set to a value between approx. 3 mm and approx. 0.5 mm.

18. The device in accordance with claim 15, wherein the adjustable spacing is set to a value of approx. 1 mm.

19. The device in accordance with claim 1, further comprising:
   a carrier coupled to at least one of the two double-belt conveyors;
   at least one slot coupling of the carrier that including at least one slot extending essentially parallel to the transport path; and
   a frame connected to the carrier via the at least one slot coupling.

20. The device in accordance with claim 1, wherein the processing device comprises at least one milling device structured and arranged to milling at least one of a longitudinal side of a panel and a transverse side of a panel.

* * * * *